(No Model.) 2 Sheets—Sheet 1.

T. S. WILKIN.
SAWMILL SETWORKS.

No. 490,463. Patented Jan. 24, 1893.

Witnesses
Geo. W. Young,
N. E. Oliphant

Inventor
Theodore S. Wilkin
By Stout & Underwood
Attorneys

THE NORRIS PETERS CO., PHOTO-LITHO., WASHINGTON, D. C.

(No Model.)  2 Sheets—Sheet 2.
T. S. WILKIN.
SAWMILL SETWORKS.
No. 490,463. Patented Jan. 24, 1893.
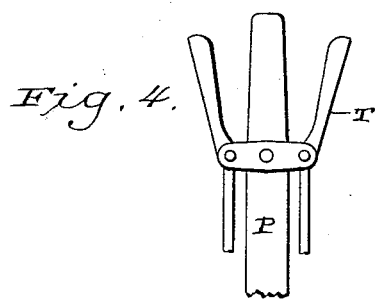
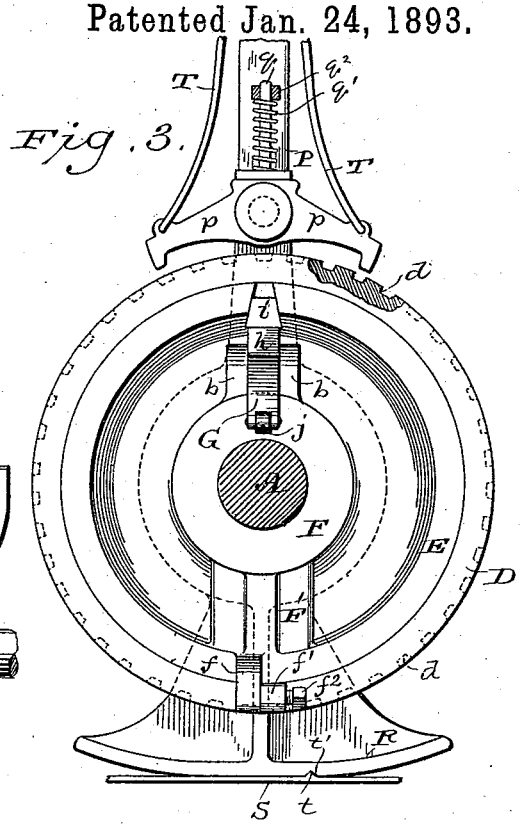
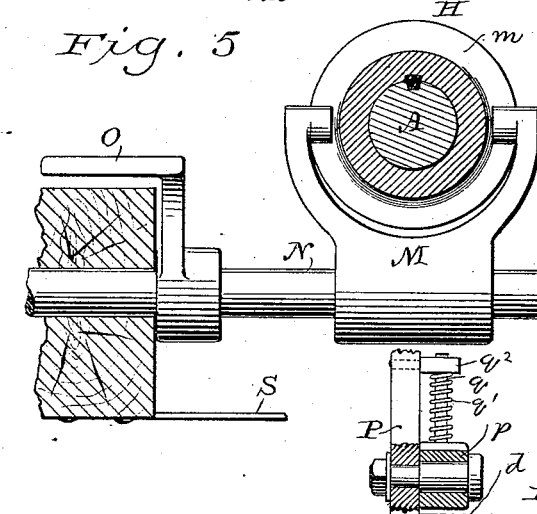
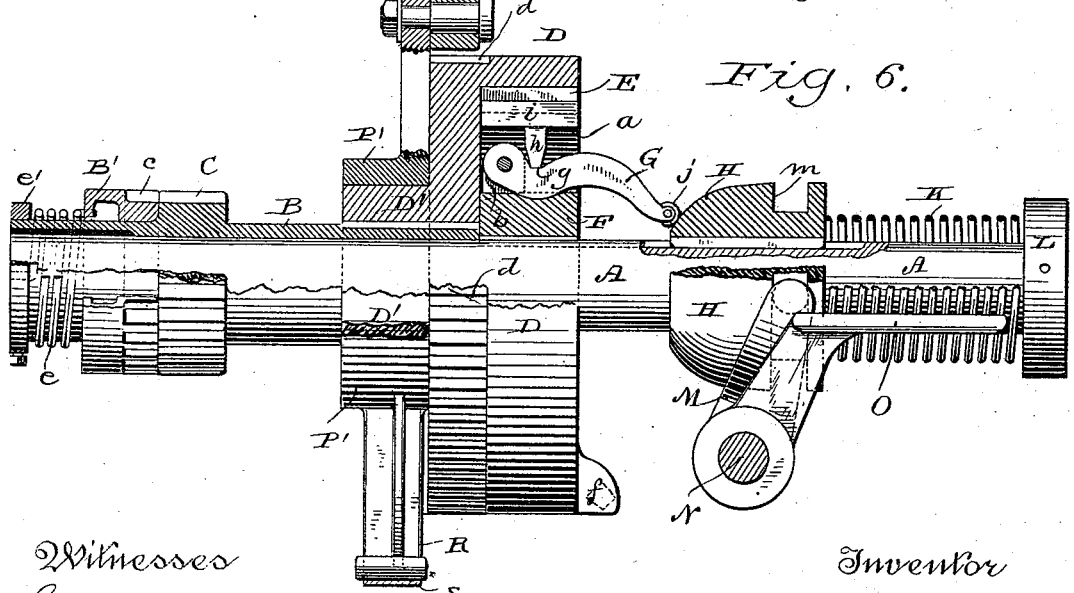
Witnesses
Geo. W. Young.
N. E. Oliphant
Inventor
Theodore S. Wilkin
By Stout & Underwood
Attorneys

UNITED STATES PATENT OFFICE.

THEODORE S. WILKIN, OF MILWAUKEE, WISCONSIN.

SAWMILL-SETWORKS.

SPECIFICATION forming part of Letters Patent No. 490,463, dated January 24, 1893.

Application filed November 22, 1888. Serial No. 291,529. (No model.)

*To all whom it may concern:*

Be it known that I, THEODORE S. WILKIN, of Milwaukee, in the county of Milwaukee, and in the State of Wisconsin, have invented certain new and useful Improvements in Sawmill-Setworks; and I do hereby declare that the following is a full, clear, and exact description thereof.

My invention relates to saw mill set works and will be fully described hereinafter.

Figure 1:
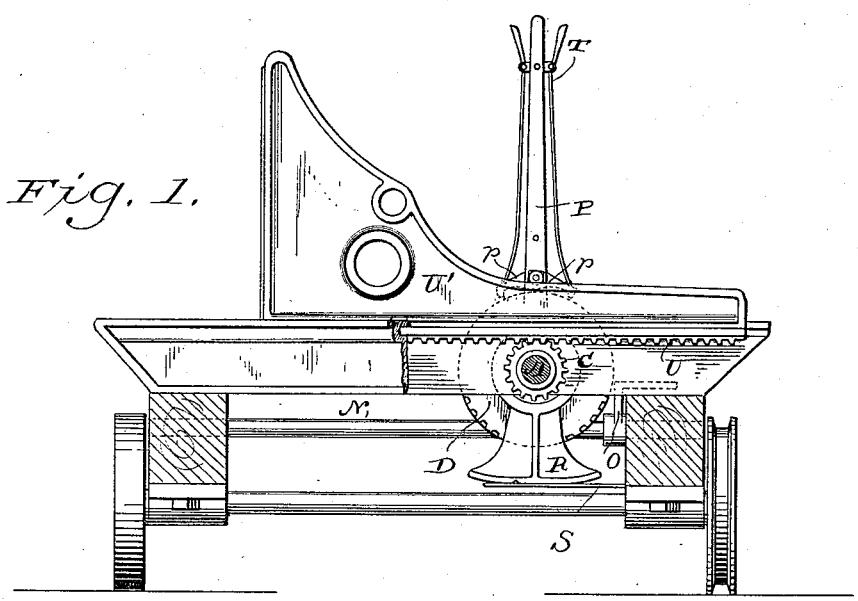
Figure 2:
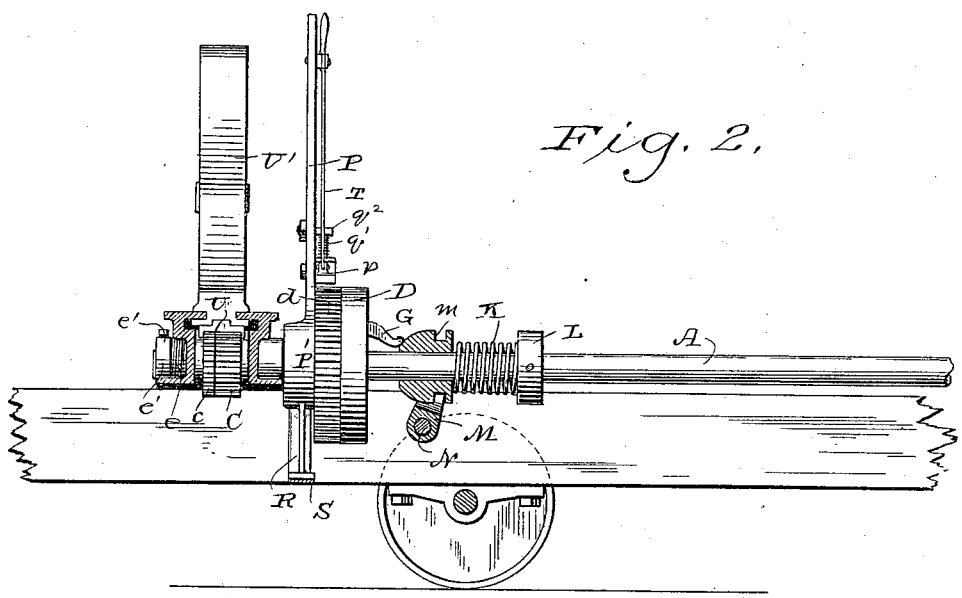

In the drawings: Figure 1 is a partly sectional end view of my device, Fig. 2 is a longitudinal sectional elevation of my device, Fig. 3 is an end view, Fig. 4 is a detail of the upper end of the operating lever, Fig. 5 is a detail, and Fig. 6 is an enlarged elevation of my device partly in vertical longitudinal section.

A is a shaft by which an entire system of knees is reciprocated and B is a sleeve that fits loosely on this shaft and carries a pinion C that may be splined upon it.

D is a wheel the hub D' of which is splined on the sleeve B. One face of the wheel D is made cup shaped as at $a$ to receive a split ring E having a hub F that is connected to it by an arm F'. Pivoted between lugs $b$ on the hub F is a lever G which is recessed at $g$ to receive a stem $h$ that projects down from a wedge $i$ that fits between the beveled ends of the split ring. The lever G is curved so that its outer end, which may be provided with a friction wheel $j$, stands in the path of a beveled head H which is splined on shaft A and is forced toward the wheel D by a spring K which is confined between it and a collar L that is secured on shaft A. An annular channel $m$ is formed in head H to receive the arms of a spanner M that is carried by a rock shaft N which latter is operated by a treadle arm O.

A portion of the periphery of wheel D is provided with cog teeth $d$ to receive the teeth of a double pawl $p$ that is pivoted to a lever P the hub P' of which loosely surrounds the hub of wheel D.

To hold the teeth of the pawl $p$ out of engagement with the teeth of wheel D when the device is not in operation, I provide a plunger $q$ the face of which is held down upon the flat upper portion of the pawl by a spring $q'$ which surrounds the stem of the plunger and abuts against the underside of an ear $q^2$ through which the stem passes, and to maintain the leevr normally in a vertical position it is formed with a segment R on its lower end, which segment is flattened at its center and rests upon a spring S, which is formed with a wedge shaped projection $t$ that fits in a V shaped notch $t'$ in the bottom of the segment. Either tooth of the pawl may be thrown into engagement with the teeth on wheel D by compressing the handle of one of the levers T toward the handle of the lever P. As shown, each of the levers T may be simply a rod pivoted to an ear on the lever P, the lower end of this rod being bent outward and connected to the relative pawl-tooth while the upper end of said rod is also bent in a direction outward from the pivot to serve as a handle. By drawing in on the handle end of the rod, the lower end of the latter tends to swing in an opposite direction and thereby lift the pawl-tooth to which it is connected.

The end of the sleeve B most remote from the wheel D receives another sleeve B' which sleeve has a pinion $c$ formed on one end of it the teeth of which correspond to those of pinion C and form a continuation of it. The two pinions are held together by a spiral spring $e$, one end of which is secured to the outer end of the sleeve B', and the other to a collar $e'$, that is keyed to sleeve B. In adjusting this part of my device, after the rack U on the under side of the knee U' (Fig. 1) has been placed upon the pinions C $c$, the collar $e'$ is turned until there is sufficient torsional force upon the pinion $c$ to give it a strong tendency to revolve independently of the pinion C, but as such independent revolution will be prevented by the rack teeth the result will be a prevention of any lost motion between the rack and pinions.

The rim of the split ring E is provided with a lug $f$ which projects out from it and down in position to engage a lug $f'$ on the face of wheel D, which lug has a set bolt $f^2$ screwed through it by adjusting which the wheel D may be properly aligned with the other wheels of like character on the shaft.

Operation. The object of my invention is to facilitate the setting of the different knees or sets of knees independently of the other knees or sets of knees in a series with especial reference to the handling of tapered logs. In saw mill set works the entire series of knees is advanced by means of a shaft A and by my device the pinion that reciprocates each knee or set of knees is connected with the shaft by the wheel D and split ring E the connection being brought about by the head H, which as it is forced forward by the spring K lifts the wedge $i$ and causes the ring E to expand and clutch the wheel D to the shaft, so that they will revolve together. Normally the parts are in this position, but when the particular knee or set of knees is to be adjusted or set back independently of the others the treadle is depressed and the head H is drawn from under lever G which permits the split ring to contract by its own elasticity and squeeze the wedge from between its ends when it becomes so small as to permit the wheel D to revolve independently of it and this particular knee or set of knees may be operated by the lever P and pawl $p$ independently of all the rest. I do not propose to confine myself to this particular clutch mechanism.

Having thus fully described my invention what I claim as new and desire to secure by Letters-Patent, is:—

1. An improved clutch mechanism, for sawmills, &c., consisting of a loose pulley, a split ring operatively located with reference to said pulley, a sliding sleeve mounted upon the pulley shaft and having an inclined head, and an arm or lever operatively connected at one end to the split ring and at the opposite end engaging the inclined head so that its movement shall expand and contract the ring, substantially as set forth.

2. The combination with the main setting shaft and the sleeve and setting pinions and wheel carried thereby of a split ring housed in said wheel, a wedge for expanding the same, a spring head and lever operated by the spring head to force the wedge between the ends of the split ring and a spanner and treadle for retracting the spring head.

3. In a saw-mill, the combination of a shaft carrying a loose pulley, a lever journaled upon the shaft and held in normal position by frictional contact with a suitable spring, a spring pressed double pawl pivoted upon the lever, and engaging the notched periphery of the pulley, and a pair of oppositely acting griplevers operatively connected to the pawl and to the operating lever, substantially as described.

4. The combination with the setting shaft, and pinion and setting wheel of the lever and pawls for operating the wheel and a holding spring adapted to bear upon the lower end of the lever to give it a tendency to stand in a vertical position when not in operation.

In testimony that I claim the foregoing I have hereunto set my hand, at Milwaukee, in the county of Milwaukee and State of Wisconsin, in the presence of two witnesses.

THEODORE S. WILKIN.

Witnesses:
S. S. STOUT,
A. H. SOUTHWELL.